United States Patent
Fujikake et al.

(10) Patent No.: US 10,696,201 B2
(45) Date of Patent: Jun. 30, 2020

(54) HEADREST AND VEHICLE SEAT

(71) Applicant: CLARION CO., LTD., Saitama (JP)

(72) Inventors: Tsutomu Fujikake, Tokyo (JP); Takao Ishikawa, Saitama (JP); Shingo Takei, Saitama (JP); Naoki Takada, Saitama (JP)

(73) Assignee: CLARION CO., LTD., Saitama (JP)

( * ) Notice: Subject to any disclaimer, the term of this patent is extended or adjusted under 35 U.S.C. 154(b) by 20 days.

(21) Appl. No.: 16/094,515

(22) PCT Filed: May 19, 2017

(86) PCT No.: PCT/JP2017/018920
§ 371 (c)(1),
(2) Date: Oct. 18, 2018

(87) PCT Pub. No.: WO2017/204125
PCT Pub. Date: Nov. 30, 2017

(65) Prior Publication Data
US 2019/0118688 A1     Apr. 25, 2019

(30) Foreign Application Priority Data
May 25, 2016  (JP) ................................. 2016-104273

(51) Int. Cl.
*B60N 2/80*        (2018.01)
*B60N 2/879*       (2018.01)
(Continued)

(52) U.S. Cl.
CPC .......... *B60N 2/879* (2018.02); *B60R 11/0217* (2013.01); *B60N 2002/899* (2018.02); *B60R 2011/0017* (2013.01); *H04R 5/02* (2013.01)

(58) Field of Classification Search
CPC ........ B60N 2/879; B60R 11/0217; H04R 5/02
(Continued)

(56) References Cited

U.S. PATENT DOCUMENTS 2,091,011 A * 8/1937 Phelps .................. H04R 1/021
                                              381/398
3,512,605 A * 5/1970 McCorkle .............. H04R 5/023
                                              381/301
(Continued)

FOREIGN PATENT DOCUMENTS

JP       2002172042 A      6/2002
JP       2015097682 A      5/2015
(Continued)

OTHER PUBLICATIONS

International Search Report for corresponding International Patent Application No. PCT/JP2017/018920 dated Jul. 18, 2017.
(Continued)

*Primary Examiner* — Syed A Islam
(74) *Attorney, Agent, or Firm* — IP Business Solutions, LLC (57) ABSTRACT

In a headrest including a core member, an acoustic speaker, and an acoustic microphone, the acoustic microphone is provided in a recessed portion provided in the core member, and a sound collection surface of the acoustic microphone is provided in a position rearward of a vibrating surface of the acoustic speaker. An opening at a tip end of the recessed portion can be provided in a position forward of a tip end of the vibrating surface of the acoustic speaker. The recessed portion can be formed into a shape that narrows from the opening toward a bottom surface. Even when the acoustic microphone is provided near to the acoustic speaker, accuracy of voice recognition by the acoustic microphone can be prevented from being reduced.

10 Claims, 9 Drawing Sheets

(51) Int. Cl.
*B60R 11/02* (2006.01)
*H04R 5/02* (2006.01)
*B60R 11/00* (2006.01)

(58) Field of Classification Search
USPC ........................................................ 381/302
See application file for complete search history.

(56) References Cited

U.S. PATENT DOCUMENTS

| | | | | |
|---|---|---|---|---|
| 3,944,020 | A * | 3/1976 | Brown | H04R 5/023 |
| | | | | 381/301 |
| 4,027,112 | A * | 5/1977 | Heppner | A47C 7/38 |
| | | | | 381/182 |
| 4,038,499 | A * | 7/1977 | Yeaple | H04R 5/023 |
| | | | | 381/301 |
| 4,086,449 | A * | 4/1978 | Takano | H04R 7/02 |
| | | | | 162/159 |
| 4,146,744 | A * | 3/1979 | Veranth | H04R 1/2819 |
| | | | | 181/146 |
| 4,638,884 | A * | 1/1987 | Lee | H04R 5/023 |
| | | | | 181/141 |
| 4,977,600 | A | 12/1990 | Ziegler | |
| 6,975,737 | B2 * | 12/2005 | Hirao | H04R 5/023 |
| | | | | 381/302 |
| 8,130,987 | B2 * | 3/2012 | Kaneda | H04R 1/26 |
| | | | | 381/301 |
| 8,160,267 | B2 * | 4/2012 | Sakamoto | H04R 5/02 |
| | | | | 297/217.3 |
| 9,088,842 | B2 * | 7/2015 | Silverstein | H04R 1/023 |
| 9,327,628 | B2 * | 5/2016 | Subat | B60N 2/879 |
| 9,428,090 | B2 * | 8/2016 | Subat | H04R 1/025 |
| 9,440,566 | B2 * | 9/2016 | Subat | H04R 5/023 |
| 9,699,537 | B2 * | 7/2017 | Oswald | H04R 1/025 |
| 9,807,486 | B2 * | 10/2017 | Schuster | H04R 1/028 |
| 10,064,496 | B2 * | 9/2018 | Takada | A47C 7/72 |
| 2014/0348349 | A1 * | 11/2014 | Nagaoka | H04R 1/288 |
| | | | | 381/162 |
| 2016/0100250 | A1 | 4/2016 | Baskin et al. | |
| 2016/0257227 | A1 | 9/2016 | Takada et al. | |
| 2017/0106775 | A1 | 4/2017 | Takada et al. | |

FOREIGN PATENT DOCUMENTS

| | | | |
|---|---|---|---|
| JP | 201611005 A | 1/2016 | |
| JP | 201674409 A | 5/2016 | |
| JP | 6109960 B2 * | 4/2017 | ......... B60R 11/0217 |
| WO | 2015076120 A1 | 5/2015 | |

OTHER PUBLICATIONS

Written Opinion for corresponding International Patent Application No. PCT/JP2017/018920 dated Jul. 18, 2017.
International Preliminary Report on Patentability issued for corresponding PCT/JP2017/018920.
Written Opinion of the International Search Authority issued for corresponding PCT/JP2017/018920.

* cited by examiner

HEADREST AND VEHICLE SEAT

TECHNICAL FIELD

The present invention relates to a headrest that receives a head of a seated person sitting on a seat. Further, the present invention relates to a seat for use in an automobile, a train, an airplane, ship, and other vehicles.

BACKGROUND ART

There has been conventionally known a headrest disclosed in Patent Literature 1 (Japanese Patent Laid-Open No. 2015-097682). The conventional headrest has acoustic speakers 125a and 125b that generate sound based on an audio signal, and an acoustic microphone 152 that collects sound and converts the sound into an electric signal, as denoted by reference sign 104 in FIG. 9, for example.

Figure 9:
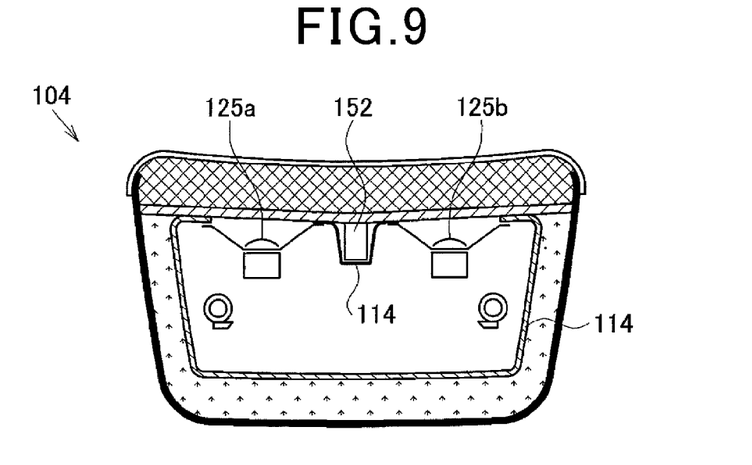
FIG. 9 is a sectional plan view illustrating a main internal structure of a conventional headrest.

In the conventional headrest 104, a sound collection section of the acoustic microphone 152 and vibrating sections of the acoustic speakers 125a and 125b are disposed side by side on the surface of a core member 114. Consequently, the conventional headrest 104 has the problem that sound generated from the acoustic speakers 125a and 125b is collected by the acoustic microphone 152, and accuracy of voice recognition is reduced.

CITATION LIST

Patent Literature

Patent Literature 1: Japanese Patent Laid-Open No. 2015-097682

SUMMARY OF INVENTION

Technical Problem

The present invention is made in the light of the problem in the conventional headrest, and an object of the present invention is to provide a headrest in which accuracy of voice recognition by an acoustic microphone is not reduced even when the acoustic microphone is provided near to an acoustic speaker.

Solution to Problem

A headrest according to an aspect of the present invention is a headrest including a core member, an acoustic speaker, and an acoustic microphone, wherein the acoustic microphone is provided in a recessed portion provided in the core member, and a sound collection surface of the acoustic microphone is provided in a position rearward of a vibrating surface of the acoustic speaker.

In a second invention aspect of the headrest according to the present invention, an opening at a tip end of the recessed portion is located in a position forward of a tip end of the vibrating surface of the acoustic speaker.

In a third invention aspect of the headrest according to the present invention, the recessed portion has a shape that narrows from an opening toward a bottom surface.

In a fourth invention aspect of the headrest according to the present invention, a wall surface of the recessed portion that connects an opening at a tip end of the recessed portion and a bottom surface of the recessed portion is linear.

In a fifth invention aspect of the headrest according to the present invention, an inner wall of the recessed portion is formed of a material to which flock coating is applied.

In a sixth invention aspect of the headrest according to the present invention, a tip end of the recessed portion juts out to an outside of the core member, and the flock coating is also applied to the jutting portion.

In a seventh invention aspect of the headrest according to the present invention, an inner wall of the recessed portion is formed of a material to which rubber coating is applied.

In an eighth invention aspect of the headrest according to the present invention, a tip end of the recessed portion juts out to an outside of the core member, and rubber coating is also applied to the jutting portion.

In a ninth invention aspect of the headrest according to the present invention, an inner wall of the recessed portion is formed of a material to which emboss processing is applied.

In a tenth invention aspect of the headrest according to the present invention, a tip end of the recessed portion juts out to an outside of the core member, and emboss processing is also applied to the jutting portion.

Next, a vehicle seat according to one aspect of the present invention is a vehicle seat including a seat cushion that receives a hip of a seated person, a seat back that receives a back of the seated person, and a headrest that receives a head of the seated person, wherein the headrest is the headrest of the above described respective invention aspects.

Advantageous Effects of Invention

According to the headrest and the vehicle seat of an aspect of the present invention, the headrest can be provided, in which accuracy of voice recognition by the acoustic microphone is not reduced even when the acoustic microphone is provided near to the acoustic speaker.

DESCRIPTION OF EMBODIMENT

Hereinafter, a headrest and a vehicle seat according to the present invention will be described based on an embodiment. It is needless to say that the present invention is not limited to the embodiment. Further, in the drawings accompanying the present description, components may be shown at different ratios from actual ratios in order to make characteristic parts understandable.

Figure 1:
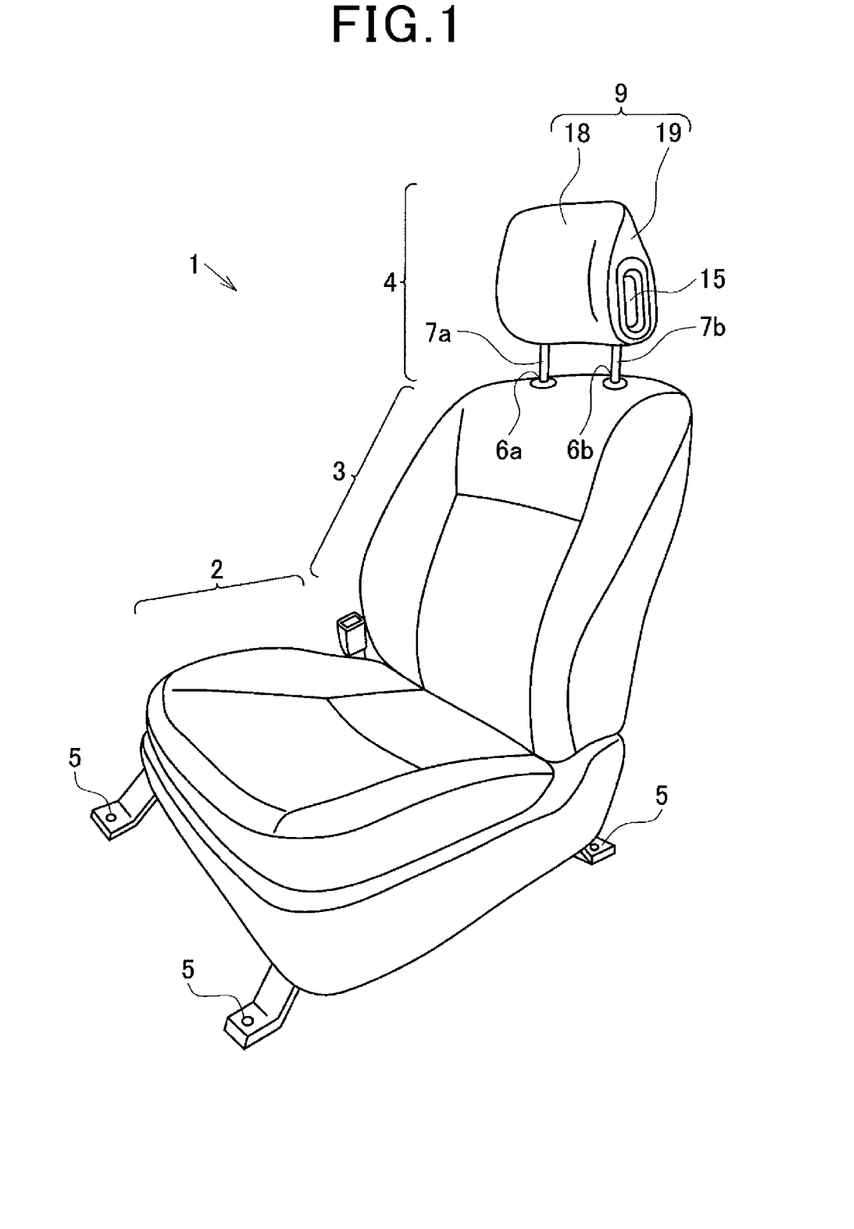
FIG. 1 is a perspective view illustrating one embodiment of a vehicle seat according to the present invention.

FIG. 1 illustrates one embodiment of the vehicle seat according to the present invention. In FIG. 1, a vehicle seat 1 has a seat cushion 2 that receives a hip of a seated person, a seat back 3 that receives a back of the seated person, and a headrest 4 that receives a head of the seated person. The seat cushion 2 is fixed to a vehicle floor at a spot of a base member 5. In FIG. 1, three base members 5 provided at three corner portions of the seat cushion 2 are illustrated, but in reality, the base member 5 is also provided at one remaining corner portion of the seat cushion 2.

In the present embodiment, the headrest 4 has a supports 7a and 7b. These supports 7a and 7b are inserted into holes 6a and 6b that are provided in an upper portion of the seat back 3, and thereby the headrest 4 is attached to the seat back 3. The headrest 4 is movable in an up-down direction in an upper surface of the seat back 3. Further, the headrest 4 can be removed from the seat back 3. In place of the configuration like this, the headrest 4 may be provided integrally with the seat back 3. The configuration like this may be called a headrest-integrated type seat back, or a headrest-integrated type vehicle seat.

Figure 2:
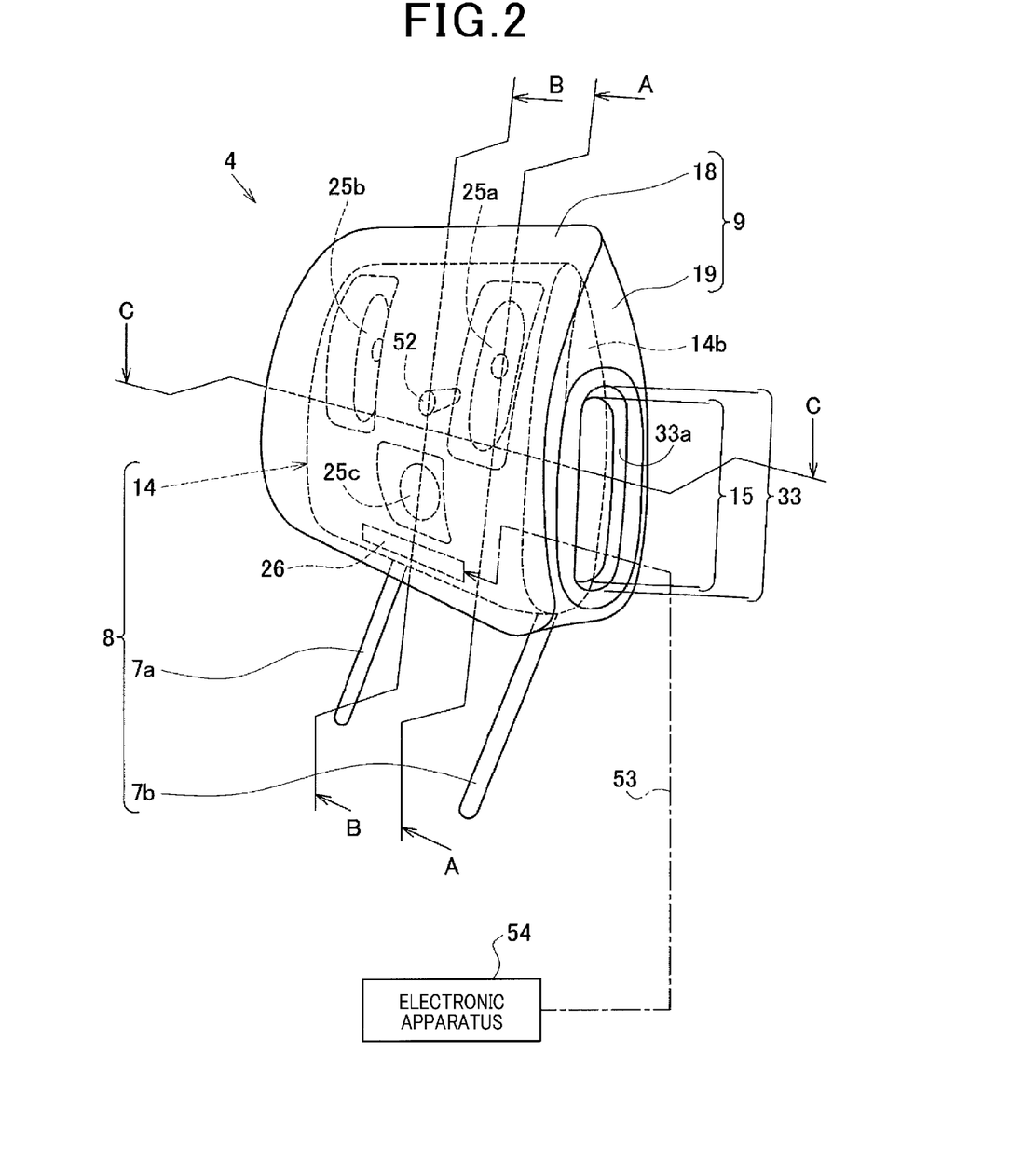
FIG. 2 is a perspective view illustrating one embodiment of a headrest according to the present invention.
Figure 3:
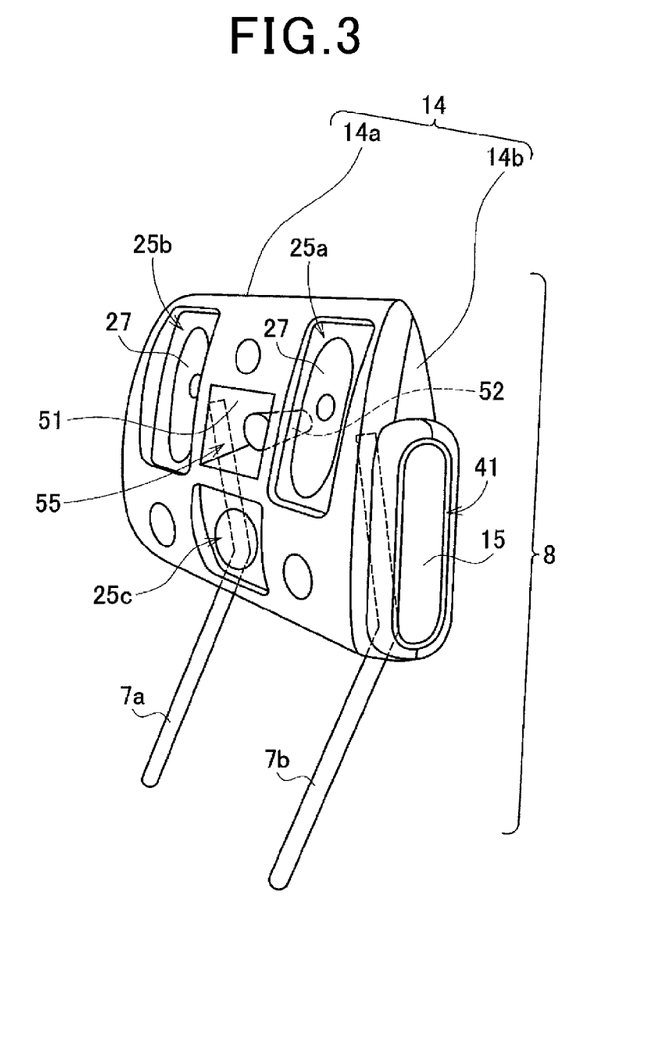
FIG. 3 is a perspective view illustrating a headrest frame that is a main part of the headrest in FIG. 2.

As illustrated in FIG. 2, the headrest 4 has a headrest frame 8 and a cover 9. As illustrated in FIG. 3, the headrest frame 8 has a core member 14 and the supports 7a and 7b. The core member 14 is formed by connecting a front side core member 14a and a rear side core member 14b. The core members 14a and 14b are formed from a rigid resin, for example, PP (polypropylene) or an ABS resin. An interface section 15 is provided at a side surface of the core member 14.

In FIG. 2, the cover 9 is formed by sewing a front side skin member 18 and a rear side skin member 19 together. An opening is formed in a bottom portion of the cover 9. The core member 14 of the headrest frame 8 is inserted into the cover 9 from the opening in the bottom portion of the cover 9, and thereby the core member 14 is covered with the cover 9. The supports 7a and 7b are extended to an outside of the cover 9. In FIG. 1, by inserting the supports 7a and 7b into the holes 6a and 6b in the upper surface of the seat back 3, the headrest 4 is attached to the seat back 3.

Figure 4:
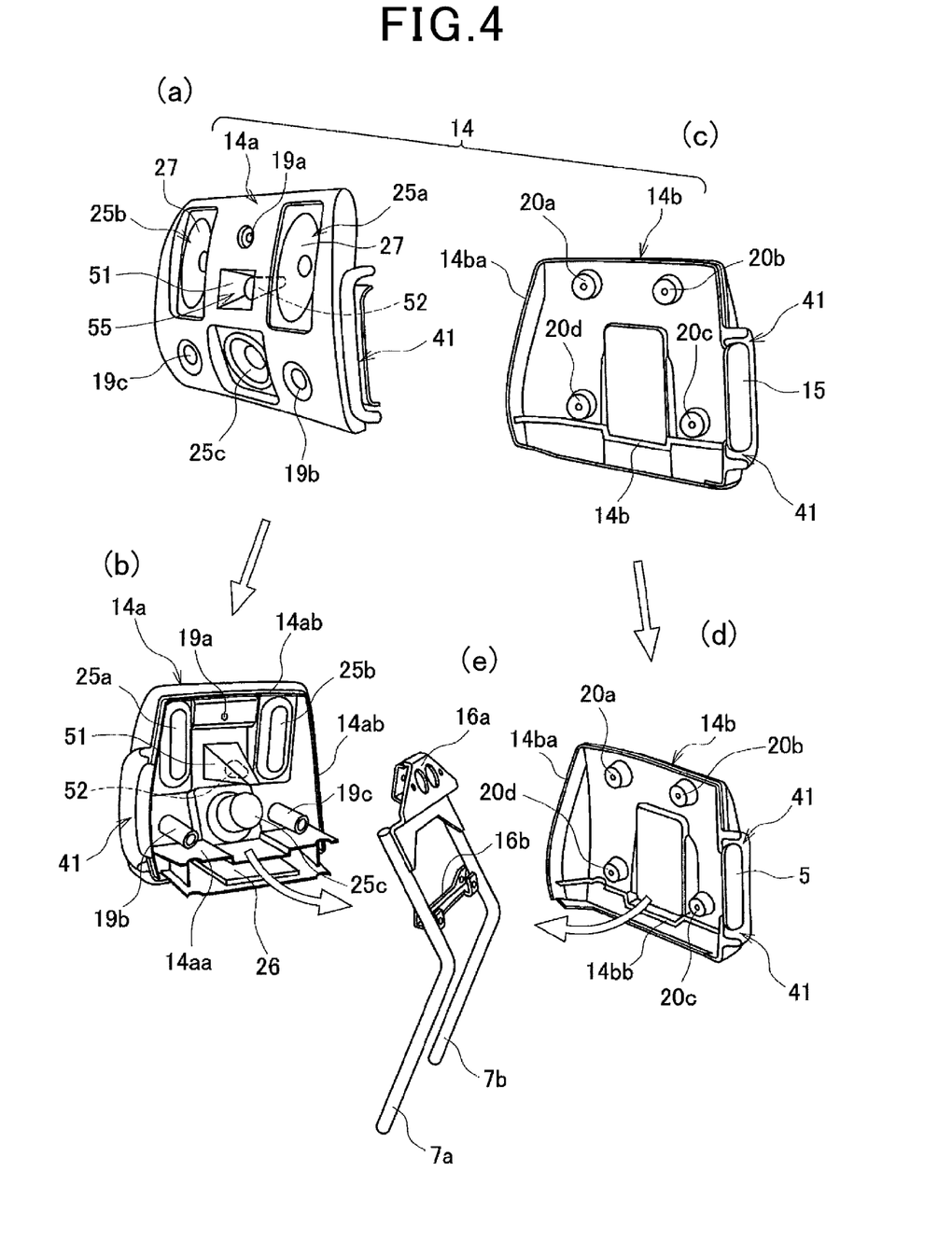
FIG. 4 is an exploded perspective view of the headrest frame in FIG. 3.

In FIG. 4(e), the supports 7a and 7b are connected to each other by an upper cross member 16a and a lower cross member 16b. The front side core member 14a is fastened to the upper cross member 16 with a screw at an inner protruded portion 19a, and is fastened to the lower cross member 16b with screws at inner protruded portions 19b and 19c.

The rear side core member 14b is fastened to the upper cross member 16a at inner protruded portions 20a and 20b with screws, and is fastened to the lower cross member 16b with screws at inner protruded portions 20c and 20d. In this way, the front side core member 14a is fixed to front sides of the supports 7a and 7b, the rear side core member 14b are fixed to rear sides of the supports 7a and 7b, and the front side core member 14a and the rear side core member 14b are connected to each other. As illustrated in FIG. 3, in the supports 7a and 7b, upper portions of the supports 7a and 7b are housed inside the core member 14, and lower portions of the supports 7a and 7b are extended to an outside of the core member 14. These extended portions are inserted into the holes 6a and 6b of the seat back in FIG. 1 as already described.

Figure 5:
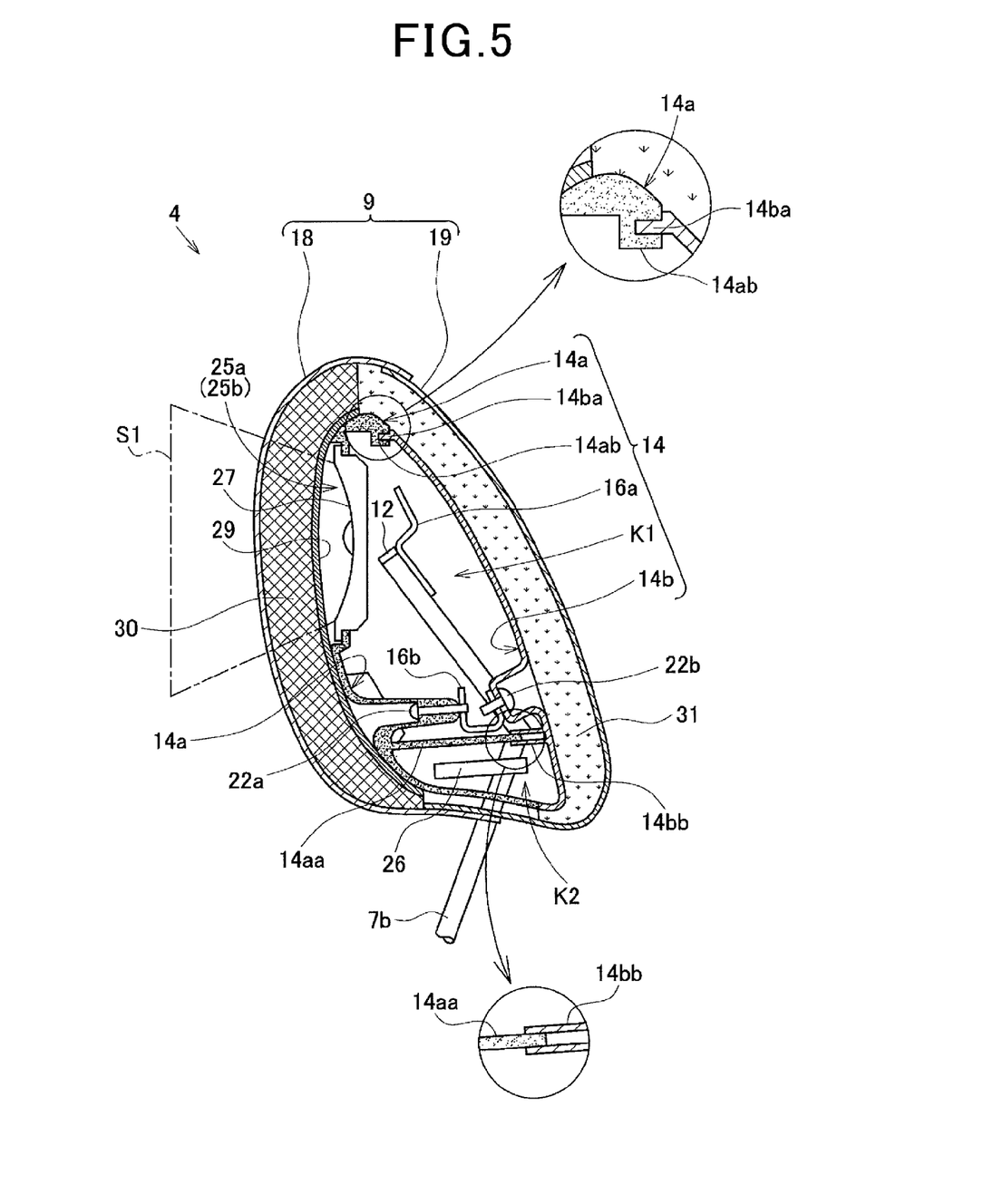
FIG. 5 is a vertical sectional view taken along line A-A in FIG. 2.
Figure 6:
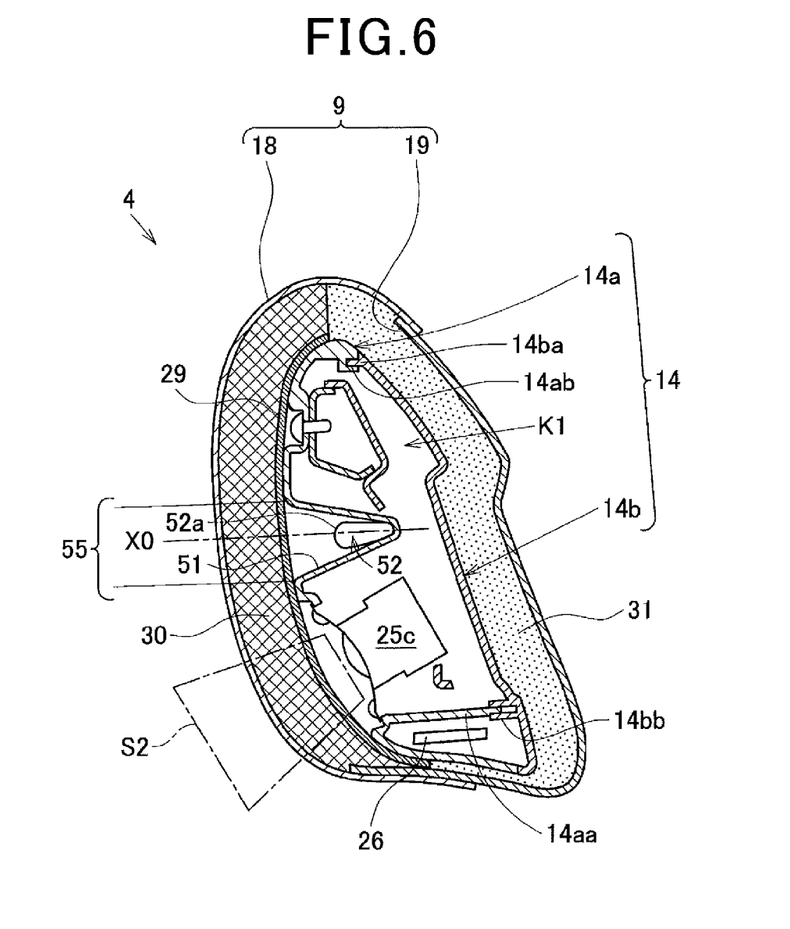
FIG. 6 is a vertical sectional view taken along line B-B in FIG. 2.
Figure 7:
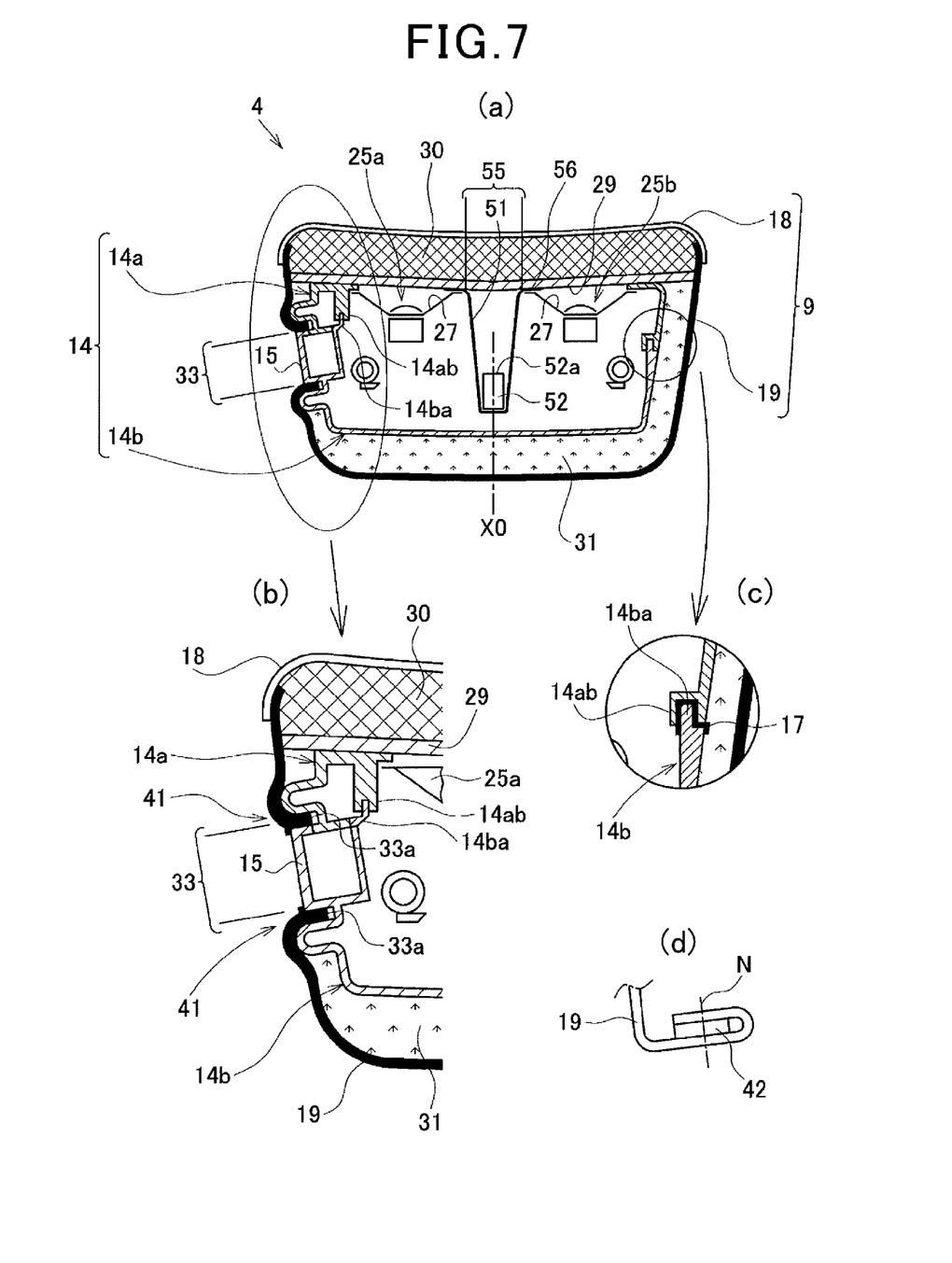
FIG. 7 is a sectional plan view taken along line C-C in FIG. 2.

FIG. 5 is a vertical sectional view taken along line A-A in FIG. 2. FIG. 6 is a vertical sectional view taken along line B-B in FIG. 2. In FIG. 6, illustration of the supports 7a and 7b is omitted. FIG. 7 is a sectional plan view taken along line C-C in FIG. 2. As illustrated in FIG. 4, FIG. 5 and FIG. 7, a fitting recessed portion 14ab is formed in a peripheral portion of the front side core member 14a. A peripheral portion of the rear side core member 14b is a fitting protruded portion 14ba. In FIG. 5, a fitting protruded portion 14aa extending in a lateral direction (direction to penetrate through a paper surface of FIG. 5) is formed at a lower portion of an inner portion of the front side core member 14a. A fitting recessed portion 14bb extending in the lateral direction (direction to penetrate through the paper surface of FIG. 5) is formed at a lower portion of an inner portion of the rear side core member 14b.

When the front side core member 14a is fixed to the upper cross member 16a and the lower cross member 16b by a screw 22a (refer to FIG. 5), and the rear side core member 14b is fixed to the upper cross member 16a and the lower cross member 16b by a screw 22b (refer to FIG. 5), the fitting protruded portion 14ba at the peripheral portion of the rear side core member 14b and the fitting recessed portion 14ab at the peripheral portion of the front side core member 14a are fitted to each other, and further, the fitting protruded portion 14aa at the lower portion of the front side core member 14a and the fitting recessed portion 14bb at the lower portion of the rear side core member 14b are fitted to each other. By fitting of these portions, a large space K1 is formed in an upper portion of an inside of the core member 14, and a small space K2 is formed in a lower portion of the inside. In FIG. 5, a control section 26 is stored in the inner space K2 at a lower side.

The control section 26 includes a communication section that exchanges a signal with an external apparatus, a speaker drive section that supplies a drive signal to an acoustic speaker, an audio signal processing section that processes an audio signal that is outputted from the acoustic microphone, and the like.

The inner space K1 at an upper side is hermetically sealed by fitting of the fitting protruded portion 14ba and the fitting recessed portion 14ab in the peripheral portion, and fitting of the fitting protruded portion 14aa and the fitting recessed portion 14bb in the lower portion. Seal members 17 can be interposed between the recessed portions 14ab and 14bb and the protruded portions 14ba and 14aa as illustrated in FIG. 7(c). The seal member 17 is, for example, sponge. The inner space K2 at the lower side in FIG. 5 is not hermetically sealed in the present embodiment. In this way, the core member 14 has a structure that is divided into two in an anterior-posterior direction, and is fixed to the supports 7a and 7b in a state sandwiching the supports 7a and 7b. Note that a hermetically sealed structure of the core member 14 is not limited to the fitting structure of the recesses and protrusions as described above, but various structures and methods can be adopted. For example, a hermetically sealed structure by ultrasonic welding can be also adopted.

Note that the supports 7a and 7b are each formed of a metal pipe or a resin pipe in a tubular shape, a cylindrical shape in the present embodiment. In the inner space K1, openings at upper ends of the supports 7a and 7b are closed with caps 12. The reason why the openings at the upper ends of the supports 7a and 7b are closed with the caps 12 is to obtain one preferable acoustic effect. In order to obtain another preferable acoustic effect in accordance with necessity, it is possible to keep the upper end openings of the supports 7a and 7b open without using the caps 12.

In FIG. 4(a) and FIG. 4(b), acoustic speakers 25a and 25b are fixed to an upper part of the front side core member 14a. The acoustic speakers 25a and 25b are, for example, speakers of a full sound range. A vibrating plate 27 of each of the acoustic speakers 25a and 25b are formed into an oval shape or an elliptical shape that is longer in an up-down direction than in a left-right direction. Sounds from the acoustic speakers 25a and 25b are outputted forward of the front side core member 14a as denoted by reference sign S1 in FIG. 5. The vibrating plate 27 is provided to face forward so that the acoustic speakers 25a and 25b can output sounds substantially horizontally. Since the vibrating plates 27 of the acoustic speakers 25a and 25b are narrow in the left-right direction, and wide in the up-down direction, directivity of the sound S1 of the acoustic speakers 25a and 25b is narrow in the left-right direction and wide in the up-down direction.

In FIG. 6, an acoustic speaker 25c is fixed to a lower part of the front side core member 14a. The acoustic speaker 25c is, for example, a woofer. A sound S2 from the acoustic speaker 25c is outputted downward to a front. By providing the acoustic speaker 25c which is a woofer to face downward, sound can be transmitted to a lower part of a body of the seated person, and the seated person is enabled to feel bass easily.

In FIG. 4(a), a recessed portion 51 is formed in the front side core member 14a between the acoustic speaker 25a and the acoustic speaker 25b. The recessed portion 51 is recessed toward an inside of the core member 14. An acoustic microphone 52 is provided in the recessed portion 51. The recessed portion 51 functions as a sound collection section. The recessed portion 51 is disposed in a central portion in a width direction of the headrest 4 (refer to FIG. 2) between the acoustic speakers 25a and 25b. Further, the recessed portion 51 is disposed in a central portion in an up-down direction of the headrest 4 (refer to FIG. 2) above the acoustic speaker 25c. Further, the recessed portion 51 is located behind a back part of the head of the seated person.

As illustrated in FIG. 6 and FIG. 7(a), the recessed portion 51 is formed into a shape narrowing toward a bottom surface (right end surface in FIG. 6) from an end (left end in FIG. 6) in which the opening 55 is opened, that is, in a long quadrangular pyramid shape, or a conical shape. A center line XO of the recessed portion 51 extends forward substantially horizontally. A front surface of the recessed portion 51 is the opening 55, and sound is taken in by the opening 55.

In the present embodiment, a wall surface of the recessed portion 51, which connects the opening 55 at a tip of the recessed portion 51 and the bottom surface of the recessed portion 51 is linear. However, an inner wall surface of the recessed portion 51 may be in a shape that changes in a step shape in accordance with necessity, or may be in a shape that curves into a recessed shape or a protruded shape in accordance with necessity.

As illustrated in FIG. 7(a), a tip end surface (that is, a sound collection surface 52a) of the acoustic microphone 52 is provided rearward (downward in FIG. 7(a)) of tip end circumferential edges of the vibrating surfaces (that is, the vibrating plates 27) of the acoustic speakers 25a and 25b. The acoustic speaker 25a and 25b generate sounds forward (upward in FIG. 7(a)) of the core member 14. On the other hand, the acoustic microphone 52 collects sound from a front surface (an upper surface in FIG. 7(a)) of the core member 14. In other words, a directivity direction of sound collection of the acoustic microphone 52 is a same direction as a directivity direction of the sounds that are generated from the acoustic speakers 25a and 25b.

Further, a flange 56 that forms the opening 55 at the tip end of the recessed portion 51 is forward (upward in FIG. 7(a)) of flanges at tip end circumferential edges of the vibrating surfaces (that is, the vibrating plates 27) of the acoustic speakers 25a and 25b. The front side core member 14a may exist between the flange 56 of the recessed portion 51 and the flanges of the acoustic speakers 25a and 25b. In this case, the flange 56 of the recessed portion 51 is disposed forward of that front side core member 14a.

In the present embodiment, the inner wall of the recessed portion 51 as the sound collection section is formed of a material to which flock coating is applied, a material to which rubber coating is applied, or a material to which emboss processing is applied. Flock coating is coating including treatment of implanting pile (short fiber) onto a raw material by a coating process. The flock coating can be realized by, for example, (1) a series of processes of coating a material with an adhesive with a spray gun or the like, using static electricity generated by applying a high voltage, and implanting pile (short fiber), (2) a series of processes of performing undertreatment, performing primer treatment, coating an adhesive, spraying pile (short fiber) uniformly, and drying, or the like.

Rubber coating is a coating for forming a soft coating film in a rubber form on a raw material. The rubber coating can be realized by, for example, (1) a process of forming a coating film in a rubber form by spraying a soft oily resin formed by mixing a synthetic resin, a pigment and an organic solvent to a raw material a plurality of times in layer, (2) a process of forming a coating film in a rubber form by spraying a soft aqueous resin formed by mixing a synthetic resin, a pigment and water to a raw material a plurality of times in layer, or the like.

Emboss processing is processing that expresses texture by giving a design (pattern) of fine recesses and protrusions to a surface of a raw material such as a metal, or plastics. There are a wide variety of patterns that are used in emboss processing, and a design of fine grains that look as if they were sprinkled sands, a pattern reproducing leather, wood grain or the like, an inorganic and geometric pattern, and the like are cited.

As illustrated in FIG. 7A, the flange 56 that forms the opening 55 at the tip end of the recessed portion 51 as the sound collection section juts out forward (upward in FIG. 7(a)) of the flanges at the tip end circumferential edges of the acoustic speakers 25a and 25b. In other words, the tip end flange 56 of the recessed portion 51 juts out to an outside (that is, a front side, that is, an upper side in FIG. 7(a)) of the front side core member 14a. Flock coating, rubber coating, emboss processing or the like is also applied to a front side surface of the tip end portion of the recessed portion 51 that juts out to the outside of the front side core member 14a in this way.

By applying flock coating, rubber coating, emboss processing or the like to the inner wall surface and a jutting surface of a tip end portion of the recessed portion 51 as the sound collection section, it becomes possible to further reduce a possibility that the sounds coming out from the acoustic speakers 25a and 25b are picked up by the acoustic microphone 52, as compared with a case in which the surface of the recessed portion 51 is formed merely to be a synthetic resin surface, a metal surface or the like.

In FIG. 2, seen from a front side (that is, the front side of an automobile as a vehicle), the acoustic speaker 25a and the acoustic speaker 25b are provided separately on the left and right, and the acoustic speaker 25c as a woofer is provided in a middle position in the left-right direction between the acoustic speakers 25a and 25b.

In FIG. 5 and FIG. 6, the front side core member 14a and the rear side core member 14b and the inner space K1 cooperate with one another to be used as an enclosure for the acoustic speakers 25*a*, 25*b* and 25*c*. The enclosure is an acoustic element for preventing sounds coming out from rear parts of the acoustic speakers 25*a*, 25*b* and 25*c* from interfering with sounds coming out from front parts of the acoustic speakers 25*a*, 25*b* and 25*c*.

Figure 8:
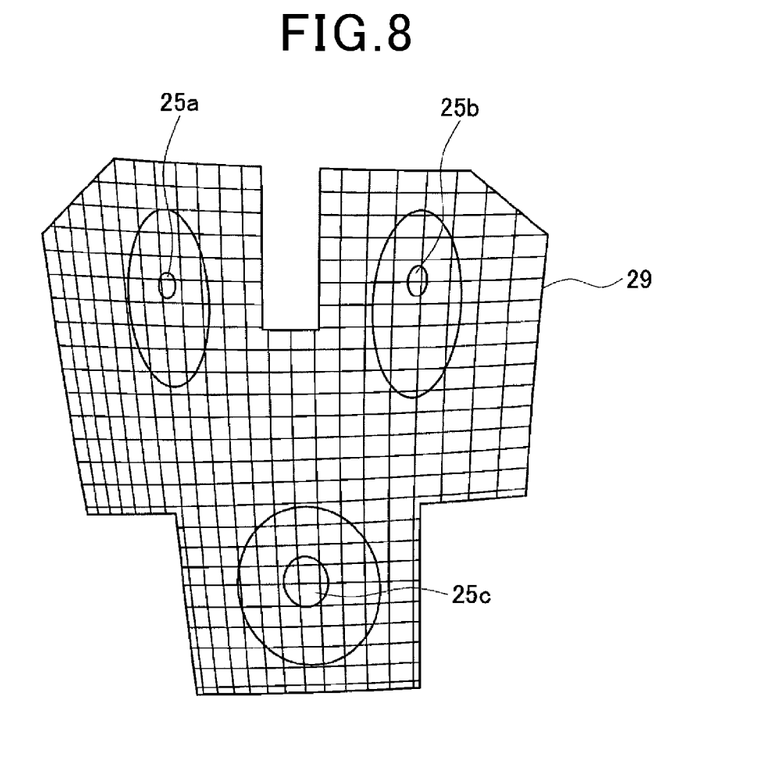
FIG. 8 is a plan view illustrating a mesh plate that is a main component of the headrest illustrated in FIG. 5.

In FIG. 5 and FIG. 7, a mesh plate 29 is provided at front parts of the acoustic speakers 25*a*, 25*b* and 25*c*, and a first elastic body 30 is further provided at a front part of the mesh plate 29. The mesh plate 29 is formed of a resin into a net shape in a planer state, and is formed into a planar shape that can cover the acoustic speakers 25*a*, 25*b* and 25*c* as illustrated in FIG. 8. The mesh plate 29 is to protect the acoustic speakers 25*a*, 25*b* and 25*c* from impact. The first elastic body 30 is formed of a material that can exhibit cushioning characteristics when the seated person puts his or her head on the first elastic body 30, and easily passes the sounds coming out from the acoustic speakers 25*a*, 25*b* and 25*c*.

As a material including the cushioning characteristics and a sound passage property like this, for example, urethane pad with holes in a part where sound is desired to pass, and an elastic material in a three-dimensional fine net shape can be used. When urethane pad with holes is used, sound can be passed through the holes.

The elastic material in a three-dimensional fine net shape is an elastic material having the following properties, for example.

(1) has a large number of fine inner spaces by three-dimensionally intertwining a fiber resin, with a total capacity of these inner spaces being quite large.

(2) is in a pad shape, that is, a padding shape, a mat shape, and a plate shape.

(3) is soft, but has such a hardness as to be able to keep an entire shape.

(4) has a thickness of 10 to 40 mm in a natural state, preferably a thickness of 20 to 40 mm.

(5) is reduced in thickness to approximately ⅔ to ½ when an adult pinches and presses the elastic material with both hands, and naturally returns in thickness to an original state by an elastic restoring force after a relatively short time period when the pressing force is released.

The sound can be passed by the elastic material in the three-dimensional fine net shape.

A second elastic body 31 is provided on a back surface of the rear side core member 14*b*. The second elastic body 31 is formed of a material that does not give a metallic hard feeling when a person touches the second elastic body 31, and has softness, but has a proper shape holding function, for example, an urethane pad material. The second elastic body 31 preferably has no function of easily passing sound.

The cover 9 formed by sewing the front side skin member 18 and the rear side skin member 19 together covers the first elastic body 30 and the second elastic body 31. In particular, the front side skin member 18 covers the first elastic body 30, and the rear side skin member 19 covers the second elastic body 31. The front side skin member 18 is formed of a material to which processing for easily passing sound is applied.

The above described "material to which processing of easily passing sound is applied" is a material including a punching leather, and a three-dimensional net material, for example. The "material including punching leather" is the material formed by pasting urethane to punching leather, and hole processing (punching processing) is applied to the punching leather including urethane to pass sound. The "three-dimensional net material" is a net material that is also called a 3D net material. The three-dimensional net material is not a pad-shaped member like the elastic material in the three-dimensional fine net shape as described above, but is a material formed into a cloth form by intertwining fibers to form large meshes of the net. The three-dimensional net material can pass sound by large mesh portions.

The rear side skin member 19 can be formed of cloth, leather, skin, synthetic leather, a synthetic resin that can be sewn up or the like. The "synthetic resin that can be sewn up" is, for example, an elastomer, a soft resin, a formed non-woven fabric, or equivalents thereof, and is a material having a shape keeping property that is a property of keeping a specific shape in a natural state.

(Interface Section)

In FIG. 2, a core member visually recognizing opening 33 is formed in a lower part of a side surface of the rear side skin member 19. The interface section 15 connects to an external region (that is, an external space) surrounding the cover 9, through the core member visually recognizing opening 33. In other words, the interface section 15 can be visually recognized from outside through the core member visually recognizing opening 33, and can be touched by a finger. The control section 26 is connected to an electronic apparatus 54 by a communication line 53. The communication line 53 is a wired or wireless communication line. The communication line 53 connects an inside and an outside of the core member 14 through the interface section 15. The electronic apparatus 54 is, for example, a cellular phone, a smartphone and a tablet terminal.

As illustrated in FIG. 7(*a*), in a state in which the front side core member 14*a* and the rear side core member 14*b* are connected to each other, the front side core member 14*a* and the rear side core member 14*b* in a peripheral region of the interface section 15 have an annular groove 41 as illustrated in FIG. 3. As illustrated in FIG. 2 and FIG. 7(*b*), an annular edge portion 33*a* of the core member visually recognizing opening 33 formed in the rear side skin member 19 is pushed into the annular groove 41. Thereby, the edge portion 33*a* of the opening 33 of the rear side skin member 19 is firmly fastened to the front side core member 14*a* and the rear side core member 14*b*.

Further, the front side core member 14*a* and the rear side core member 14*b* form an annular protruded portion that protrudes in an external direction in an annular portion that forms the groove 41. Therefore, an annular protruded portion that protrudes in the external direction are formed in a location of the core member visually recognizing opening 33 of the rear side skin member 19. These protruded edge shapes are shapes that satisfy the internal projection requirements of a sphere of a diameter φ of 165 mm for measurement of the safety standards.

When the rear side skin member 19 illustrated in FIG. 7(*b*) is formed of a material having a shape keeping property such as a synthetic resin capable of being sewn up and an elastomer, the edge portion 33*a* of the core member visually recognizing opening 33 is formed to have substantially same thicknesses as a width of the groove 41. Consequently, when the edge portion 33*a* is inserted into the groove 41, the edge portion 33*a* is not easily removed from the groove 41. Further, when the rear side skin member 19 is formed of cloth, leather or skin, an insertion edge portion to the groove 41 can be formed by folding a tip end of the skin member 19 with a resin plate 42 inserted and thereafter sewing (reference sign N) the folded portion as illustrated in FIG. 7(*d*).

In this way, in the present embodiment, the interface section 15 which is a part of the core member 14 in FIG. 3 connects to an external region (that is, an external space)

surrounding the rear side skin member 19 through the core member visually recognizing opening 33 of the rear side skin member 19 in FIG. 2. That is, in the present embodiment, the interface section 15 which is a part of the core member 14 faces outward, that is, is exposed through the core member visually recognizing opening 33 of the cover 9.

(Function of Headrest)

The headrest 4 of the present embodiment is configured as above, so that when the seated person puts the rear part of the head on the front side skin member 18 of the cover 9 in FIG. 1, the seated person can feel favorable cushioning properties. Further, by supplying desired audio signals to the acoustic speakers 25*a*, 25*b* and 25*c* from the control section 26 in FIG. 5, desired sound or music can be generated from these acoustic speakers. The seated person can recognize the sounds from the acoustic speakers 25*a*, 25*b* and 25*c* in the state in which the seated person puts the rear part of the head on the cover 9.

At this time, the front side core member 14*a*, the rear side core member 14*b* and the inner space K1 cooperate with one another to function as the enclosure, and supply desired sounds forward of the acoustic speakers 25*a*, 25*b* and 25*c*. Further, the mesh plate 29, the first elastic body 30 and the front side skin member 18 are all formed of materials that easily pass sound, so that no hindrance occurs to the hearing of the sound by the seated person. In FIG. 5 and FIG. 6, on the other hand, the second elastic body 31 and the rear side skin member 19 that are disposed behind the acoustic speakers 25*a* and 25*b* and the acoustic speaker 25*c* are formed of materials that hardly pass sound, so that sound can be prevented from leaking rearward of the headrest 4.

In the present embodiment, voice data of contents that are read out from the electronic apparatus 54 in FIG. 2, guidance voice data for guiding the vehicle to a destination and the like can be outputted as voice from the acoustic speakers 25*a*, 25*b* and 25*c*. Further, the voice generated by the seated person is collected by the acoustic microphone 52 to convert the voice into an audio signal, and the electronic apparatus 54 can be operated based on the audio signal. Further, the seated person can talk with his/her hands free via the acoustic microphone 52.

In FIG. 6 and FIG. 7(*a*), the acoustic microphone 52 is formed into a cylindrical shape. An axial line of the acoustic microphone 52 substantially corresponds to the axial line XO of the recessed portion 51. The acoustic microphone 52 is provided inside the recessed portion 51 that functions as the sound collection section in this way, sound can be efficiently collected by the acoustic microphone 52. Consequently, even when the seated person projects a voice toward the front, the voice can be reliably received by the acoustic microphone 52.

The acoustic speakers 25*a* and 25*b*, the acoustic speaker 25*c* and the acoustic microphone 52 are disposed to conform to the internal projection requirements and R requirements (radius of curvature requirements) of the safety standards. Specifically, the acoustic microphone 52 is disposed in a recessed position in the recessed portion 51, so that the sphere of the diameter of 165 mm for measurement does not contact the acoustic microphone 52.

As illustrated in FIG. 7(*a*), a tip end surface (that is, the sound collection surface 52*a*) of the acoustic microphone 52 is provided at a rear position (a lower position in FIG. 7(*a*)) from the tip end circumferential edges of the vibrating surfaces (that is, the vibrating plates 27) of the acoustic speakers 25*a* and 25*b*. Thereby, the sounds coming out from the acoustic speakers 25*a* and 25*b* can be prevented from being collected by the acoustic microphone 52. As a result, noise of the voice collected by the acoustic microphone 52 is reduced and it becomes possible to perform accurate voice recognition.

Further, the opening 55 at the tip end of the recessed portion 51 as the sound collection section is located forward (upward in FIG. 7(*a*)) of the tip end circumferential edges of the vibrating surfaces (that is, the vibrating plates 27) of the acoustic speakers 25*a* and 25*b*. Thereby, the sounds coming out from the acoustic speakers 25*a* and 25*b* can be prevented from entering into the recessed portion 51, and as a result, accuracy of voice recognition by the acoustic microphone 52 can be enhanced.

Further, in the present embodiment, in FIG. 7(*a*), flock coating, rubber coating, emboss processing or the like is applied to the inner wall surface and the tip end flange 56 of the recessed portion 51 as the sound collection section (that is, the jutting surface). Thereby, it becomes possible to further reduce the possibility that the sounds coming out from the acoustic speakers 25*a* and 25*b* are picked up by the acoustic microphone 52, as compared with the case in which the surface of the recessed portion 51 is simply made a synthetic resin surface, or a metal surface.

According to the present embodiment, the opening at the tip end of the recessed portion is located forward of the tip ends of the vibrating surfaces of the acoustic speakers. According to the configuration, the sounds coming out from the acoustic speakers can be prevented from entering into the recessed portion, and as a result, accuracy of voice recognition by the acoustic microphone can be enhanced.

According to the present embodiment, the recessed portion has the shape that narrows from the opening toward the bottom surface. According to the configuration, reduction in the sound collecting function by the acoustic microphone can be prevented, and entry of noise into the acoustic microphone can be efficiently suppressed in addition.

According to the present embodiment, the wall surface of the recessed portion, which connects the tip end of the recessed portion and the bottom surface of the recessed portion, is linear. According to the configuration, the recessed portion can be simply formed, and an additional process such as flock coating, rubber coating, and emboss processing is easily performed.

According to the present embodiment, the inner wall of the recessed portion is formed of a material to which flock coating is applied, a material to which rubber coating is applied, or a material to which emboss processing is applied. By these configurations, it becomes possible to further reduce the possibility that the sound coming out from the acoustic speakers are picked up by the acoustic microphone, as compared with the case in which the surface of the recessed portion is simply made a synthetic resin surface, a metal surface or the like.

When flock coating, rubber coating, emboss processing or the like is applied to the inner wall of the recessed portion, it is desirable to jut the tip end of the recessed portion to the outside of the core member, and also apply flock coating, rubber coating, emboss processing or the like to the jutted portion. Thereby, it is possible to further reduce the possibility that sounds coming out from the acoustic speakers are picked up by the acoustic microphone.

Next, the vehicle seat according to the present invention is the vehicle seat having the seat cushion that receives the hip of the seated person, the seat back that receives the back of the seated person, and the headrest that receives the head of the seated person, wherein the headrest is the headrest according to the aforementioned embodiment. According to the vehicle seat, in the headrest which is one of the components, the tip end surface (that is, the sound collection surface) of the acoustic microphone is provided at the position rearward from the vibrating surfaces of the acoustic speakers, so that the sounds coming out from the acoustic speakers can be prevented from being collected by the acoustic microphone. As the result, noise of the voice collected by the acoustic microphone is reduced, and it is possible to perform accurate voice recognition.

Other Embodiments

While the present invention is described by citing a preferable embodiment thus far, the present invention is not limited to the embodiment, and can be variously modified within the range of the invention described in the claims.

For example, in the above described embodiment, the acoustic microphone 52 is provided in the middle position between the two acoustic speakers 25a and 25b, as illustrated in FIG. 4(a). However, the position where the acoustic microphone 52 is provided can be an arbitrary position other than the middle position between the two acoustic speakers 25a and 25b. Further, the number of acoustic speakers may be one, or three or more.

In the above described embodiment, the acoustic microphone 52 is provided with respect to the acoustic speakers 25a and 25b of a full range. However, the acoustic speakers relating to the acoustic microphone are not limited to full-range speakers, but may be speakers of an arbitrary sound range.

REFERENCE SIGNS LIST

1. Vehicle seat, 2. Seat cushion, 3. Seat back, 4. headrest, 5. Base member, 6a, 6b. Hole, 7a, 7b. Support, 8. Headrest frame, 9. Cover, 12. Cap, 14. Core member, 14a. Front side core member, 14aa. Fitting protruded portion, 14ab. Fitting recessed portion, 14b. Rear side core member, 14ba. Fitting protruded portion, 14bb. Fitting recessed portion, 15. Interface section, 16a. Upper cross member, 16b. Lower cross member, 17. Seal member, 18. Front side skin member, 19. Rear side skin member 19a to 19c. Inner protruded portion, 20a to 20d. Inner protruded portion, 22a, 22b. Screw, 25a, 25b. Acoustic speaker, 25c. Woofer (acoustic speaker), 26. Control section, 27. Vibrating plate, 29. Mesh plate, 30. First elastic body, 31. Second elastic body, 33. Core member visually recognizing opening, 41. Annular groove, 42. Resin plate, 51. Recessed portion of front side core member 14a, 52. Acoustic microphone, 52a. Sound collection surface, 53. Communication line, 54. Electronic apparatus, 55. Opening, 56. Flange, K1, K2. Space, N. Sewn portion, S1, S2. Sound, XO. Center line

The invention claimed is:

1. A headrest comprising:
a core member;
an acoustic speaker; and
an acoustic microphone,
wherein the acoustic microphone is provided in a recessed portion provided in the core member, and
a sound collection surface of the acoustic microphone is provided in a position rearward of a vibrating surface of the acoustic speaker,
wherein an opening at a tip end of the recessed portion is located in a position forward of a tip end of the vibrating surface of the acoustic speaker.

2. The headrest according to claim 1, wherein the recessed portion has a shape that narrows from the opening toward a bottom surface.

3. The headrest according to claim 1, wherein an inner wall of the recessed portion is formed of a material to which flock coating is applied.

4. The headrest according to claim 3, wherein the tip end of the recessed portion juts out to an outside of the core member, and the flock coating is also applied to the jutting portion.

5. The headrest according to claim 1, wherein an inner wall of the recessed portion is formed of a material to which rubber coating is applied.

6. The headrest according to claim 5, wherein the tip end of the recessed portion juts out to an outside of the core member, and the rubber coating is also applied to the jutting portion.

7. The headrest according to claim 1, wherein an inner wall of the recessed portion is formed of a material to which emboss processing is applied.

8. The headrest according to claim 7, wherein the tip end of the recessed portion juts out to an outside of the core member, and the emboss processing is also applied to the jutting portion.

9. A vehicle seat comprising:
a seat cushion that receives a hip of a seated person;
a seat back that receives a back of the seated person; and
a headrest that receives a head of the seated person,
wherein the headrest includes a core member, an acoustic speaker, and an acoustic microphone,
wherein the acoustic microphone is provided in a recessed portion provided in the core member, and
a sound collection surface of the acoustic microphone is provided in a position rearward of a vibrating surface of the acoustic speaker,
wherein an opening at a tip end of the recessed portion is located in a position forward of a tip end of the vibrating surface of the acoustic speaker.

10. A headrest comprising:
a core member;
an acoustic speaker; and
an acoustic microphone,
wherein the acoustic microphone is provided in a recessed portion provided in the core member, and
a sound collection surface of the acoustic microphone is provided in a position rearward of a vibrating surface of the acoustic speaker,
wherein a wall surface of the recessed portion that connects an opening at a tip end of the recessed portion and a bottom surface of the recessed portion is linear.

* * * * *